Patented Jan. 18, 1938

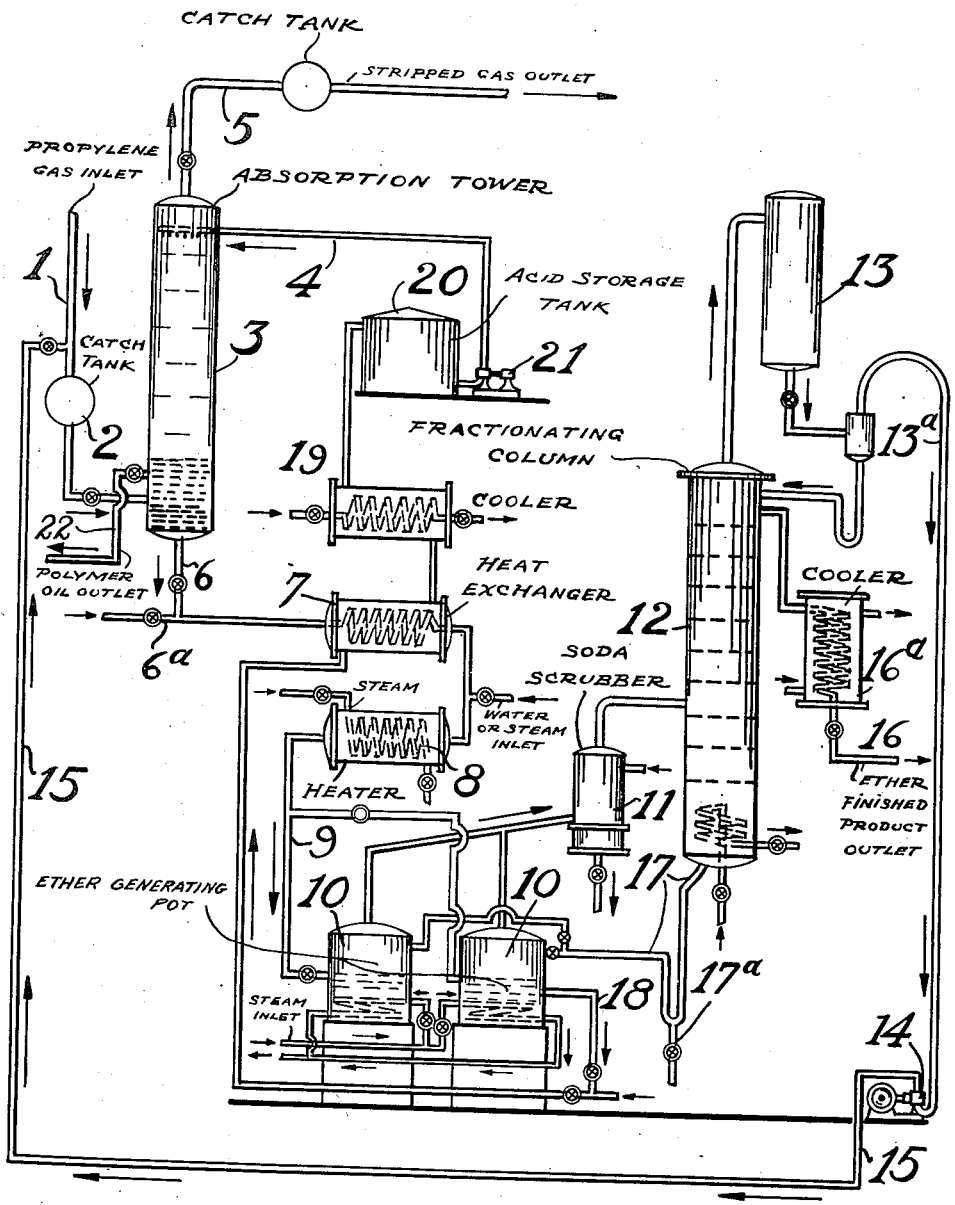

2,105,508

UNITED STATES PATENT OFFICE 2,105,508

MANUFACTURE OF ISOPROPYL ETHER

Raphael Rosen, Cranford, Hyym E. Buc, Roselle, and Robert B. Lebo, Elizabeth, N. J., assignors to Standard Alcohol Company Application December 29, 1934, Serial No. 759,660

4 Claims. (Cl. 260—151)

This invention relates to a process of manufacturing isopropyl ether direct from propylene.

According to the prior art, ethers are generally manufactured from the corresponding alcohols. For instance, olefines are contacted with concentrated, e. g. 90–95%, sulfuric acid to form monoalkyl sulfates which are then hydrolyzed with water to form the alcohols. These, in turn, are contacted with strong sulfuric acid and two molecules of the alcohol are condensed with the splitting off of water to form one molecule of the ether. Such a process has been practiced both for manufacturing ethyl ether as well as isopropyl and other ethers.

The present invention is a simplified process in which propylene is converted directly into isopropyl ether by contacting it with sulfuric acid of substantially one concentration, preferably between the approximate limits of 70 and 85%.

Several methods of carrying out the invention may be used, i. e.:

One method comprises mere contacting of the propylene with sulfuric acid of about 75% concentration under optimum temperature and pressure conditions, such as 50 to 100 lbs. pressure and a temperature between the approximate limits of 75° and 125° C. Such a process may be conveniently carried out by passing the propylene gas upward through a tower packed with inert contact bodies, such as Raschig rings, and trickling the sulfuric acid downwardly from the top in countercurrent to the rising propylene gas. The vapors issuing from the top are then condensed and fractionated to obtain the ether, and the acid issuing from the bottom of the tower is recycled to the top. This same process may be carried out by feeding the propylene in through a porous thimble at the bottom of a tower filled with acid and drawing off ether-containing vapors at the top.

Another method comprises absorbing the propylene at a low temperature, e. g. 0° to 50° C. (preferably about 20° C. to 30° C. in 75–85% H2SO4), and driving off the ether at high temperature, e. g. 100° to 125° C., this being conveniently done in a tall tower, cooled at the bottom and heated at the top, in which the pressure may be the same throughout, e. g. 50 to 500 lbs., preferably about 200 lbs. when the absorption is carried out at about 20° C.

A third method comprises carrying out the absorption and ether generation in two separate vessels maintained at the same temperture but under different pressures, for example, absorbing under a pressure of 50 to 500 lbs. per square inch and at a temperature of 100° to 125° C. and taking off the ether-containing vapors by releasing the pressure to about atmospheric.

A fourth method is the same as the third except that different temperatures are used. In other words, two separate vessels are used for absorption and ether conversion, the temperature and pressure both being different in these two vessels. For instance, the absorption may be conveniently carried out under a pressure of about 200 lbs. per square inch (roughly 50 to 500 lbs.) and at a temperature of 20° C. (roughly 0° to 50° C.), using sulfuric acid of about 80% concentration and the ether generation being carried out at about atmospheric pressure and at a temperature between the approximate limits of 100° and 125° C.

Another example of this preferred method of operation is to absorb propylene in 80 to 85% sulfuric acid at 200 lbs. pressure and 25° to 35° C. where an acid product is obtained containing 10 lbs. of 66° sulfuric acid per gallon of equivalent isopropyl alcohol. This product is removed from the absorption zone and sufficient water is added to bring the acid strength below 80% (to prevent polymer formation during the generation of ether), preferably near 75%. The product is then heated to 100° to 110° C. and the mixture of isopropyl ether, isopropyl alcohol and propylene generated is fractionated to separate these three materials.

The accompanying drawing is a schematic layout of apparatus suitable for carrying out this method.

It is preferred to carry out the invention in a continuous manner (although a batch process may be used) and accordingly it is generally desirable to add make-up water (or steam) in order to compensate for the amount of water withdrawn from the acid by converting the propylene into isopropyl ether according to the reaction:

$$2C_3H_6 + H_2O \longrightarrow C_3H_7OC_3H_7,$$

and any water withdrawn in the fractionating zone. Other economies and efficiencies are obtained by recycling olefines (which may be generated along with the ether) to the absorption zone, also by recycling any isopropyl alcohol (which may be generated along with the ether) to the ether generation zone, and also by the use of heat exchangers between the raw materials and products of the absorption and ether generation zones. Any polymers which may be formed in the absorption zone may either be removed, cracked and recycled to the absorption zone, or may be passed on through the ether generation zone and fractionated to a desired boiling point, for instance, to make a product suitable for blending with motor fuels.

Referring to the drawing, propylene gas from any desired source, not shown, is fed through line 1 through catch tank 2 into the bottom of absorption tower 3 in countercurrent to sulfuric acid which is fed through line 4 into the top of tower 3. Unabsorbed gases, consisting chiefly of saturated hydrocarbons which may have been present in the feed gas containing the propylene, pass off at the top of the tower 3 through line 5. The sulfuric acid descending in the tower 3 becomes charged with absorbed propylene and passes via line 6 through heat exchanger 7 and steam heater 8, then via line 9 into ether generating pots 10 which may be heated by steam or any other suitable means, the vapors driven off then passing through soda scrubber 11 into fractionating column 12, from which any propylene or other gases liberated are passed through scrubber 13, compressor 14, and recycled through line 15 into the original feed line 1. The ether vapors condensing at the top of the fractionating column 12 are withdrawn through line 16 and cooler 16a from the top plate of the fractionating column 12.

The liquor withdrawn at the bottom of the fractionating column 12 consists chiefly of isopropyl alcohol (liberated as a by-product in the ether generating pot) together with about 30% of water, and is, with or without removal of the water, conveniently refluxed through line 17 into ether generating pots 10, or withdrawn at 17a for further refining as alcohol. The refluxing of the alcohol to the ether generating pots permits more accurate control of conditions under which the ether is generated and also permits the acid to be concentrated to a higher strength before running to the absorption zone. The spent acid liquor issuing from these ether generating pots 10 is recycled through line 18, through heat exchanger 7, cooler 19, into the acid storage tank 20, from which it is withdrawn by means of pump 21 to be fed through line 4 back into the top of absorption tower 3. Any polymerized oil forming in the propylene absorption tower 3 may be withdrawn from the bottom of tower 3. Make-up water or steam, required to compensate for the water withdrawn from the acid by conversion of propylene into isopropyl ether, may be added to the acid liquor passing from absorption tower 3 to ether generating pot 10. A mixed ether may be made by feeding ethyl alcohol from line 6a into line 6.

Instead of using pure propylene, commercially available gases containing appreciable amounts of propylene may be used; for instance, the stabilizer gas from liquid phase cracking contains up to 18% propylene and from vapor phase cracking, up to 30% or more. The propane fraction of fractionated gyro gas or vapor phase cracking may contain as high as 60 to 70% propylene. The propylene or gases containing same, may be purified in any desired manner before being contacted with the sulfuric acid; for instance, they may be scrubbed with soda or treated with triethanolamine, etc. to remove sulfur.

The absorption of the propylene in the sulfuric acid may be aided by adding to the acid a small amount of isopropyl ether or of a higher molecular weight ether. This step may be conveniently carried out by recycling into the appropriate point of the absorption zone a small amount of an ether product. The absorption may also be carried out in catalytic liquid media other than sulfuric acid, e. g. 90–100% phosphoric acid.

When the propylene is absorbed in sulfuric acid in one vessel and then this charged liquor is passed into an ether generating vessel, which may be heated by steam for instance, the vapors issuing from this generator are preferably scrubbed with soda in order to remove any free acid which may be carried over mechanically in the vapors, the scrubbed vapors then being fractionated in a suitable fractionating column, if desired, to separate the isopropyl ether from some isopropyl alcohol which may have been formed simultaneously. However, it may not always be necessary or desirable to separate this small amount of isopropyl alcohol from the isopropyl ether as a small amount of this alcohol will not do any harm when the ether is to be used as a motor fuel or motor fuel blending agent and, in fact, a small amount of this alcohol may be considered to be a valuable addition agent.

The invention has been found particularly applicable as a commercial method of making isopropyl ether for use as a motor fuel or motor fuel blending agent, which subject matter has been disclosed and claimed in co-pending application Serial No. 648,211, filed December 21, 1932 by Hyym E. Buc.

The invention is not to be limited to the specific embodiments shown or the specific examples given, nor to any theories advanced as to the operation of the invention, but in the appended claims it is intended to claim all inherent novelty in the invention as broadly as the prior art permits.

We claim:

1. The process of manufacturing isopropyl ether which comprises absorbing propylene in sulfuric acid of about 70 to 85% concentration at a temperature between the approximate limits of 0° and 50° C. and under a pressure of approximately 50 to 500 lbs. per square inch maintaining the sulfuric acid at the said concentration of approximately 70 to 85% and then generating isopropyl ether from said acid at a temperature of about 100° to 125° C. at approximately atmospheric pressure.

2. Process of manufacturing isopropyl ether, which comprises converting propylene directly into ether by contacting it with a hydrating catalytic medium at a temperature between the approximate limits of 0° and 50° C. and under a pressure of approximately 50 to 500 pounds per square inch whereby a substantial amount of ether is formed which remains in solution in the hydrating catalytic medium, after which said hydrating catalytic medium is subjected to heat to remove the said ether from solution.

3. Process of manufacturing isopropyl ether according to claim 2, in which the hydrating catalytic medium is maintained at the same concentration and used continuously to form the said ethers.

4. Process of manufacturing isopropyl ether, which comprises absorbing propylene in sulfuric acid of about 70 to 85% concentration at a temperature and under a pressure to keep isopropyl ether in solution in the sulfuric acid as it is formed, and then separating the isopropyl ether from the said sulfuric acid at a higher temperature and lower pressure so that ether may be separated as a vapor.

RAPHAEL ROSEN.
HYYM E. BUC.
ROBERT B. LEBO.